United States Patent
Sanders et al.

(10) Patent No.: US 10,297,384 B2
(45) Date of Patent: May 21, 2019

(54) METHOD FOR PROCESSING A PLATE WORKPIECE

(71) Applicant: GM GLOBAL TECHNOLOGY OPERATIONS LLC, Detroit, MI (US)

(72) Inventors: Ronald Sanders, Ruesselsheim (DE); Hartmut Baumgart, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/347,322

(22) Filed: Nov. 9, 2016

(65) Prior Publication Data

US 2017/0133153 A1    May 11, 2017

(30) Foreign Application Priority Data

Nov. 10, 2015   (DE) .................. 10 2015 014 490

(51) Int. Cl.
| | |
|---|---|
| *B21B 15/00* | (2006.01) |
| *B23K 9/00* | (2006.01) |
| *C21D 9/48* | (2006.01) |
| *B21J 15/02* | (2006.01) |
| *H01F 41/02* | (2006.01) |

(52) U.S. Cl.
CPC ..... *H01F 41/0253* (2013.01); *B21B 15/0007* (2013.01); *B21J 15/02* (2013.01); *B23K 9/00* (2013.01); *C21D 9/48* (2013.01); *B21B 2015/0092* (2013.01); *C21D 2201/00* (2013.01); *C21D 2201/03* (2013.01); *C21D 2211/001* (2013.01); *C21D 2211/005* (2013.01); *C21D 2221/00* (2013.01)

(58) Field of Classification Search
CPC ........ B21B 2015/0092; B21B 15/0007; C21D 2201/03; C21D 2211/005; C21D 2211/001; C21D 2221/00; C21D 2201/00
USPC .................................... 148/559, 611
See application file for complete search history.

(56) References Cited

U.S. PATENT DOCUMENTS

| | | |
|---|---|---|
| 4,042,427 A | 8/1977 | Razim et al. |
| 5,735,163 A | 4/1998 | Sato et al. |
| 6,143,094 A * | 11/2000 | Sugiyama ................ C21D 7/02 |
| | | 148/120 |
| 6,554,924 B2 | 4/2003 | Morrow et al. |

(Continued)

FOREIGN PATENT DOCUMENTS

| | | |
|---|---|---|
| DE | 1925029 C3 | 6/1980 |
| DE | 19650258 A1 | 6/1998 |

(Continued)

OTHER PUBLICATIONS

United States Patent Office, United States Office Action for U.S. Appl. No. 15/347,283, dated Apr. 25, 2017.

(Continued)

*Primary Examiner* — Jermie E Cozart
(74) *Attorney, Agent, or Firm* — Lorenz & Kopf, LLP

(57) ABSTRACT

A workpiece made of plate is subjected to a treatment which locally modifies its magnetic permeability. Subsequently, the magnetic permeability of the workpiece is examined locally resolved by a probe in order to find at least one surface region which is suitable for intended processing, and the processing is performed locally limited to the selected region.

18 Claims, 2 Drawing Sheets

(56) References Cited

U.S. PATENT DOCUMENTS

| | | | |
|---|---|---|---|
| 7,075,402 B1* | 7/2006 | Reyal | C21D 7/02 336/234 |
| 8,722,203 B2 | 5/2014 | Laurent et al. | |
| 2002/0092587 A1 | 7/2002 | Morrow et al. | |
| 2004/0159378 A1* | 8/2004 | Gehringhoff | B62D 25/04 148/533 |
| 2006/0222880 A1 | 10/2006 | Hanlon | |
| 2010/0007206 A1 | 1/2010 | Wodrich | |
| 2014/0345753 A1 | 11/2014 | Bors | |
| 2016/0017457 A1* | 1/2016 | Baumgart | B21C 37/02 428/686 |

FOREIGN PATENT DOCUMENTS

| | | |
|---|---|---|
| DE | 10038139 A1 | 2/2002 |
| DE | 102008003871 A1 | 7/2009 |
| DE | 102009023195 A1 | 12/2010 |
| DE | 102009042387 A1 | 8/2011 |
| DE | 102010035339 B4 | 5/2012 |
| DE | 102013216317 A1 | 2/2015 |
| EP | 0345936 A1 | 12/1989 |
| JP | S53109882 A | 9/1978 |
| JP | S5947372 A | 3/1984 |
| JP | S62253778 A | 11/1987 |
| JP | 01003556 A * | 1/1989 |
| JP | H01100710 A | 4/1989 |
| JP | 2007116181 A | 5/2007 |
| WO | 2015179747 A1 | 11/2015 |

OTHER PUBLICATIONS

German Patent Office, German Search Report for Country Application No. 102014010660.8, dated May 19, 2015.

German Patent Office, German Search Report for German Application No. 102015014490.1, dated Nov. 23, 2016.

* cited by examiner

METHOD FOR PROCESSING A PLATE WORKPIECE

CROSS-REFERENCE TO RELATED APPLICATION

This application claims priority to German Patent Application No. 102015014490.1, filed Nov. 10, 2015, which is incorporated herein by reference in its entirety.

TECHNICAL FIELD

The present disclosure relates to a method for processing a workpiece made of plate.

BACKGROUND

From DE 196 50 258 A1 a method is known, with which the properties of a metal part are modified on the surface by laser alloying. The alloying components are supplied in the form of rods or wires. Following the laser alloying, the modified regions are usually not difficult to distinguish from unalloyed regions, since during the supply of material by the rod or wire that is locally closely limited it can hardly be avoided that irregularities remain on the surface of the plate.

In the application DE 10 2014 010 660.8 a method is described, with which the properties of a plate are locally modified, in that an amorphous mass containing an alloying element is locally placed onto the plate and heated together with the plate in order to alloy an alloying element contained in the mass into the part of the surface of the plate covered by the mass, while the uncovered remainder of the surface remains unalloyed. Since the amorphous mass can be applied over a large area but in a substantially thinner layer than with a rod or wire, such a treatment does not necessarily leave behind visible traces on the surface of the plate which make possible an unambiguous distinction of alloyed and unalloyed regions from one another. This makes it difficult to take into account the position of the alloyed regions during the further processing of the plate. However, when the position of the alloyed regions is not taken into account there is a high probability that a subsequent processing step is performed on a surface region which is not suitable for this, so that the processing fails or results in a product that is defective in quality.

Accordingly, there is a need for a method with which it can be ensured in a simple and reliable manner that processing steps are performed on the surface regions provided for this purpose.

SUMMARY

The present disclosure utilizes the fact that by locally alloying elements into the surface of a plate not only characteristics such as ductility, weldability etc. which are not only relevant for further processing are decisively influenced but also the ferromagnetism—which is not relevant for applications in particular in vehicle construction—and that the magnetic permeability of a surface region of a plate—in particular compared with other surface regions of the same plate—can clearly indicate whether the surface region concerned has been subjected to alloying or not. For this reason, when during the processing of a workpiece made of plate the magnetic permeability of the workpiece is examined locally resolved, the region of the plate which is suitable for an intended processing and which is not can be securely distinguished by way of the examination results, and the processing can be performed locally limited on the selected, suitable region.

In automobile construction, substantially ferritic steel plates, i.e. plates with body-centered cubic lattice structure are used, which by nature are ferromagnetic. By heating to above the austenitization temperature, the lattice structure changes to face-centered cubic, and the ferromagnetism is lost. By the addition of austenite-forming alloying elements such as for example Ni, Co, Mn, C it can be achieved that the austenite state is retained even at room temperature. When the alloying of these elements stays locally selective, a plate with magnetic properties that are different from place to place can be obtained.

Conversely, a ferritizing additive can be alloyed into an originally austenitic plate, for example made from a stainless steel, in order to create a region with a deviating magnetic permeability.

A region, the magnetic properties of which differ from the remainder of a workpiece can be found, even if not visible with the eye, by scanning of the workpiece with a magnetic probe such as for example a Hall or Foerster probe. Based on the knowledge of the position of this surface region, a region of the workpiece to be processed—which can be the austenitic surface region itself or an adjacent ferritic region—can subsequently be located in order to perform local processing on this region. The local processing can in particular be a cutting of the workpiece in the selected region; thus the workpiece can be divided into multiple parts each of which can be further processed separately.

A workpiece to be cut in this manner can have a plurality of identically formed treated regions, wherein the locating of a cut line by way of these regions results in that the treated regions are arranged in the same manner on each of the parts obtained. The workpiece can in particular be a plate strip generally uncoiled from a coil and the local processing a cutting-out of parts for further processing from the plate strip.

The local processing can also be a forming of the workpiece in the selected region or the fastening of a second workpiece to the selected region. The fastening of the second workpiece can take place by welding, screwing or riveting.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
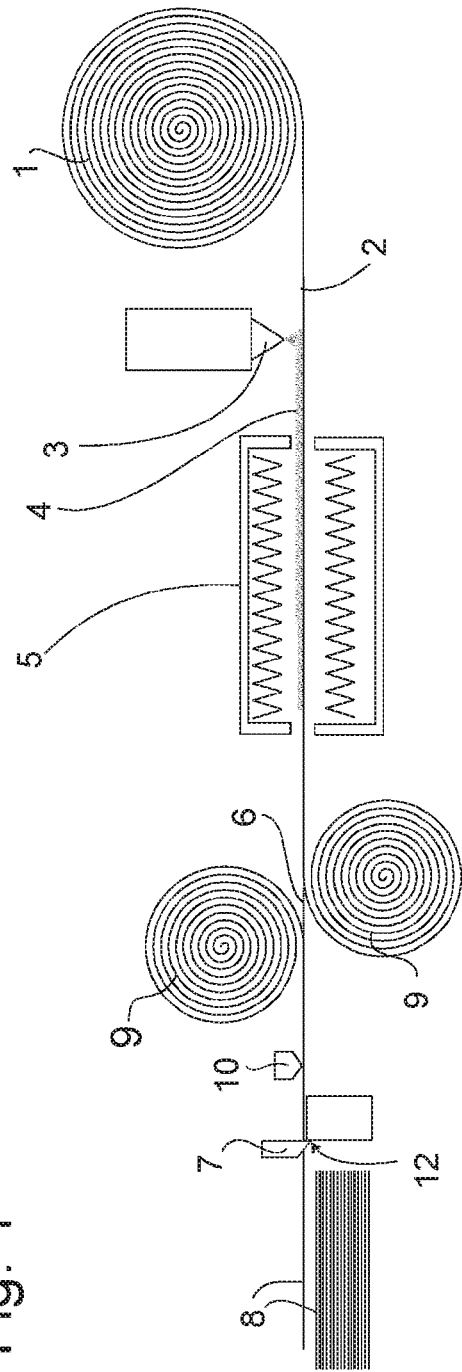
FIG. 1 shows a schematic sequence of a method according to a first configuration of the present disclosure.

FIG. 1 schematically shows different stages of the method according to a first configuration of the present disclosure. At a first stage, shown in the right part of FIG. 1, a ferromagnetic steel plate to be worked is present as a plate strip 2 coiled into a coil 1.

Figure 2:
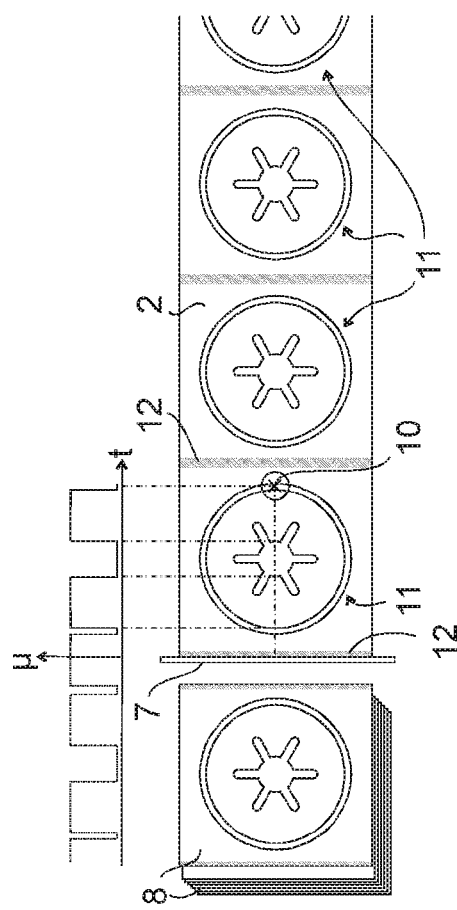
FIG. 2 shows a detail of the method from FIG. 1.

The plate strip 2 is gradually uncoiled from the coil 1 and passes a screen printing device or, as shown in the figure, one or more spray nozzles 3, which apply an amorphous mass 4 in periodically repeating patterns 11, as purely exemplarily shown in a top view in FIG. 2, by spraying onto a part of the surface of the strip 2, while the same passes under the nozzles 3. The nozzles 3 can be stationary or moveable transversely to the running direction of the plate strip 2.

The amorphous mass contains at least one alloying element such as for example chromium or manganese, which during the alloying has an austenitizing effect on the regions of the plate strip 2 coated with the mass 2. In addition, the mass 2 can also contain other elements which when alloyed-in impart the coated region of the plate strip 2 desired properties for the further processing, which can vary depending on the type of the intended further processing.

Following the application of the amorphous mass 4 on the plate strip 2, the same passes through an oven 5, in which it is subjected to a heat treatment, during which the alloying elements out of the amorphous mass 4 diffuse into the surface regions of the plate 2 coated with the mass 4. The heat treatment takes place under an inert gas atmosphere, for example nitrogen, in order to exclude undesirable reactions of the plate strip 2 or of the mass 4 with oxygen of the air.

Following the heat treatment in the oven 5, the plate strip 2, as indicated by a dashed line 6, can be directly separated by a punching tool or knife 7 into parts 8; however, the present disclosure is applicable particularly advantageously in the case where the plate strip 2 following the heat treatment is coiled into a coil 9 and the coil 9 is only subsequently uncoiled again for separating the workpieces 8. Accordingly, in particular the coating with the amorphous mass 4 and the heat treatment in the oven 5 as specified by a customer can be carried out in the steel plant, possibly even immediately following the rolling and prior to the initial coiling, and the coil 9 locally alloyed in such a manner supplied to the customer. Following the delivery of the coil to the customer, separation and subsequent further processing of the parts 8 then takes place in the production facilities of the customer.

The alloyed regions which are austenitized at least on the surface and the unalloyed regions of the plate strip 2 are distinguishable from one another by way of their different magnetic permeability. When the coil 9 is uncoiled at the customer and in the process the plate strip 2 is guided past a magnetic probe such as for example a Foerster probe 10, the passage of the repeating patterns 11 in front of the probe 10 result in that the same supplies a periodic signal $\mu(t)$ that is representative for the magnetic permeability of the passing material, corresponding to the small diagram in FIG. 2, by way of which the position of the patterns 11 on the plate strip 2 is inferred and the movement of the knife 7 synchronized with the plate strip 2 in such a manner that the plate strip is severed in each case in a region 12 between two patterns 11 and a complete, well-centered pattern 11 is allocated to each part 8 severed by the knife 7.

Figure 3:
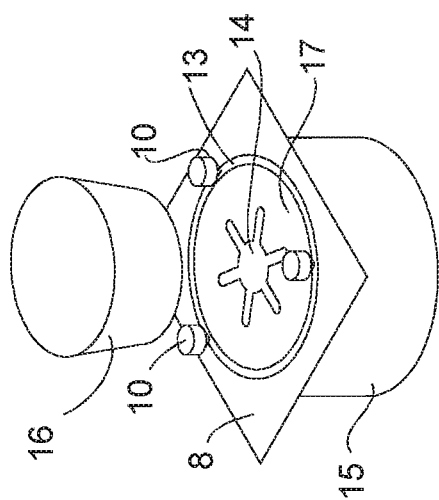
FIG. 3 show a local processing of a workpiece according to a second configuration of the method.

A part 8 obtained in this manner forms the workpiece 8 of a following processing step shown in FIG. 3. The pattern 11 in this case includes two alloyed or austenitic regions, a ring 13 and a star 14. The workpiece 8 can be placed for further processing by deep-drawing on a drawing die 15. Here, three magnetic probes 10 are arranged on a circle the diameter of which corresponds to the ring 13; these can be contained in a hold-down which is not shown. When all three probes 10 measure a low magnetic permeability $\mu$ corresponding to an austenitic surface, the ring 13 then lies on the circle of the probes 10, and the workpiece 8 is correctly centered with respect to the drawing die 15. Accordingly, when a drawing mandrel 16 is lowered onto the workpiece 8, the resulting deformation and stretching of the plate is limited to a non-alloyed ferritic region 17 of favorable ductility between the ring 13 fixed between drawing die 15 and hold-down and the star 14.

Figure 4:
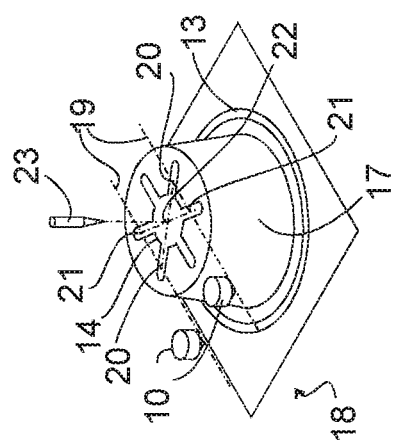
FIG. 4 shows a local processing according to a third configuration of the present disclosure.

FIG. 4 shows a cup-shaped workpiece 18, which could be obtained out of the workpiece 8 by the deep-drawing step of FIG. 3. The star-shaped alloyed region 14 is located on the bottom of the cup and in its middle a further workpiece may be fastened by welding, riveting, screwing or the like. In order to find the center of the star 14, two magnetic probes 10 are guided over the bottom of the cup in approximately parallel paths 19 crossing the rays of the star 14. In the process, two points 20, 21 are determined on each path 19, at which the path 19 of a probe 10 crosses the rays of the star 14. A point of intersection 22 of a straight line running through the points 20 and a straight line running through the points 21 indicates the center point of the star 14, so that a tool 23 such as for example a drill, a welding rod or the like can be exactly aligned with the point 22 and with its help the second workpiece which is not shown be fastened exactly in the middle of the star 14.

Figure 5:
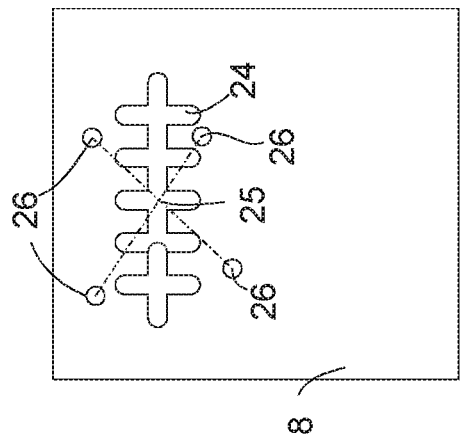
FIG. 5 schematically illustrates a workpiece for a fourth configuration of the method.

The method according to the present disclosure is not necessarily limited to the differentiation of alloyed and non-alloyed regions and the utilization of their various properties. Accordingly it is by all means possible for example to apply patterns onto the plate strip which consists of two or more differently composed amorphous masses in order to obtain from this a workpiece 8 as shown in FIG. 5. Among the amorphous masses used there can be one which when alloyed into the plate supplies a region 24 with properties that are desirable for a certain type of further processing, but the magnetic properties of which do not differ to a sufficient degree from those of the unalloyed plate in order to allow a direct recognition of the region 24 by the magnetic probe 10 or its shape—for example since composed of many identical elements—is poorly suited for unambiguous position measurement. In order to unambiguously define in this region 24 a point 25—for example for fastening a further workpiece thereto—a second mass can be applied which in the subsequent heat treatment forms austenitic regions 26 which are securely detectable on the treated plate and from the position of which that of the point 25 can be easily derived.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for processing a workpiece made of plate comprising:
   treating the workpiece to modify a magnetic permeability of a local region thereof;
   subsequently examining the magnetic permeability of the workpiece to find at least one surface region which is suitable for an intended processing; and
   processing the workpiece to perform the intended processing relative to the at least one surface region,
   wherein treating the workpiece comprises alloying an additive material into the local region of the workpiece.

2. The method according to claim 1, wherein the workpiece is ferritic and treating the workpiece further comprises austenitizing the local region of the workpiece.

3. The method according to claim 1, wherein the workpiece is austenitic and treating the workpiece further comprises ferritizing the local region of the workpiece.

4. The method according to claim 1, wherein processing the workpiece comprises cutting the workpiece relative to the at least one surface region to obtain a part from the workpiece configured for further processing.

5. The method according to claim 4, wherein the workpiece comprises a plurality of identically formed austenitized regions, the method further comprising cutting a plurality of parts from the workpiece, each of the plurality of parts having a similarly arranged austenitized region.

6. The method according to claim 5, wherein the workpiece comprises a plate strip.

7. The method according to claim 5, wherein the workpiece comprises a blank.

8. The method according to claim 1, wherein processing the workpiece comprises forming the local region.

9. The method according to claim 1, wherein the local region comprises a fastening point configured to receive a second workpiece for fastening with at least one of welding, screwing, or riveting.

10. The method according to claim 9, wherein the fastening point is selected in an austenitized surface region.

11. A method for processing a workpiece made of plate comprising:
    providing an austenitic workpiece;
    ferritizing the workpiece to modify a magnetic permeability of a local region thereof;
    subsequently examining the magnetic permeability of the workpiece to find at least one surface region which is suitable for an intended processing; and
    processing the workpiece to perform the intended processing relative to the at least one surface region,
    wherein processing the workpiece comprises cutting the workpiece relative to the at least one surface region to obtain a part from the workpiece configured for further processing.

12. The method according to claim 11, wherein the workpiece comprises a plurality of identically formed austenitized regions, the method further comprising cutting a plurality of parts from the workpiece, each of the plurality of parts having a similarly arranged austenitized region.

13. The method according to claim 12, wherein the workpiece comprises a plate strip.

14. The method according to claim 12, wherein the workpiece comprises a blank.

15. The method according to claim 11, wherein processing the workpiece comprises forming the local region.

16. The method according to claim 11, wherein the local region comprises a fastening point configured to receive a second workpiece fastening with at least one of welding, screwing, or riveting.

17. The method according to claim 16, wherein the fastening point is selected in an austenitized surface region.

18. A method for processing a workpiece made of plate comprising:
    providing a ferritic workpiece;
    austenitizing the workpiece to modify a magnetic permeability of a local region thereof;
    subsequently examining the magnetic permeability of the workpiece to find at least one surface region which is suitable for an intended processing; and
    processing the workpiece to perform the intended processing relative to the at least one surface region,
    wherein processing the workpiece comprises cutting the workpiece relative to the at least one surface region to obtain a part from the workpiece configured for further processing.

* * * * *